Jan. 22, 1935.  C. BENDER  1,988,681
DIPPING RACK
Original Filed Feb. 17, 1932
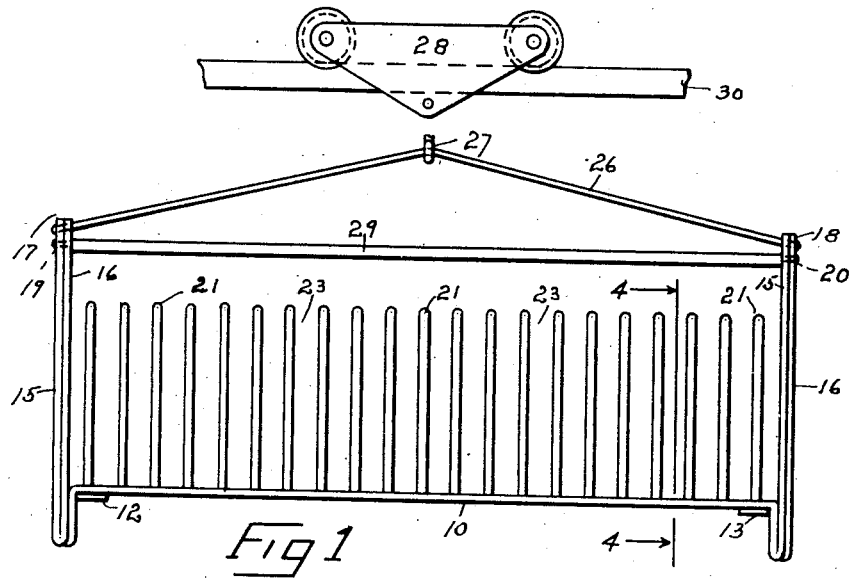
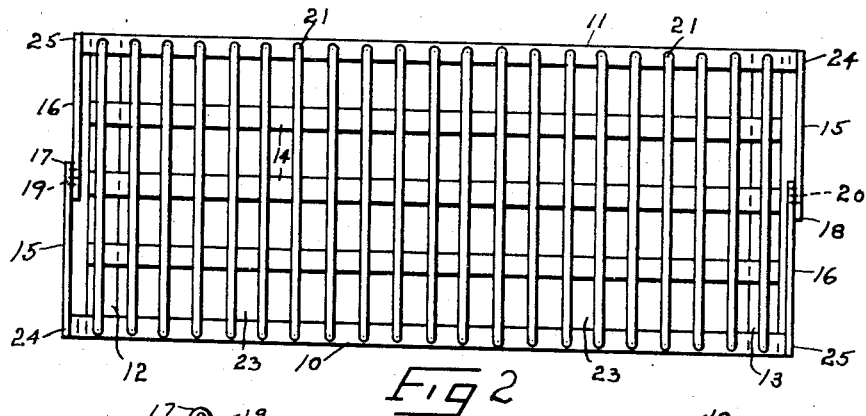
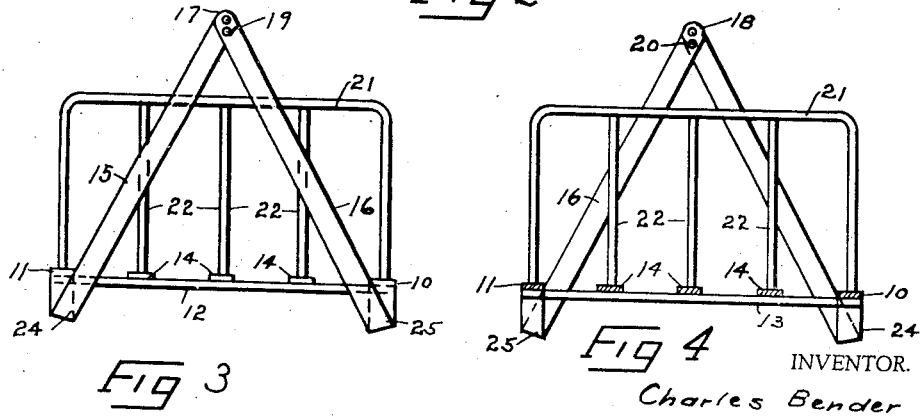
INVENTOR.
Charles Bender
BY
ATTORNEY.

Patented Jan. 22, 1935

1,988,681

UNITED STATES PATENT OFFICE 1,988,681

DIPPING RACK

Charles Bender, Brooklyn, N. Y., assignor, by mesne assignments, to Sanben Corporation, New York, N. Y., a corporation of New York Refiled for abandoned application Serial No. 593,477, February 17, 1932. This application June 30, 1934, Serial No. 733,310

2 Claims. (Cl. 141—1)

The invention relates to a dipping rack particularly adapted for dipping photographic films to recover the silver contained in the collodion coating as well as the celluloid base. It has for its main object to provide a rack of special construction which will support a large number of large, thin films in such a manner that all of the surfaces will come in intimate contact with the dipping solution and that the films will not come in contact with each other, which would cause them to adhere to each other. Another object is to provide a rack of simple, strong and inexpensive construction.

These and other objects and advantages will be readily understood from the following description and from the accompanying drawing, in which Fig. 1 is a side elevation of the rack, Fig. 2 a plan view with ports omitted, Fig. 3 an end view, and Fig. 4 a sectional view taken on line 4—4, on Fig. 1.

Referring to all the views the rack consists of a bottom frame made up of two side bars 10 and 11, and two cross bars 12 and 13, which are welded, or otherwise secured, to the side bars. A plurality of intermediate bars 14 are also secured to the cross bars. The ends 15 and 16 of the side bars are bent downward and then angularly upward so that the extreme ends meet as at 17 and 18, where holes 19 and 20 are drilled. The rack is suspended by a cable 26 which is engaged on the hook 27 of a block and fall which is pending from an overhead trolley 28 which rides on a rail 30. The block and fall is not shown. On large racks a spacing bar 29 is employed to strengthen the rack. This spacing bar engages in the holes in the upper ends of the supporting members.

A plurality of spacing members are located transversely on the bottom frame. They are spaced only a short distance apart and each consists of an inverted U-shaped wire member 21, the legs of which are welded, or riveted to the side bars, and a plurality of intermediate rods 22 the lower ends of which are secured to the intermediate bars 14, and the upper ends to the U-shaped members.

The rack is used for the following purpose: Films are placed in the spaces 23 formed between the spacing members and the rack is submerged in a hot, caustic solution which removes the collodion with which the films are coated, as well as the silver compound contained in the collodion. The open construction of the rack assures intimate contact between the films and the solution, and the legs 24 and 25, which are formed by bending the ends 15 and 16, prevent the rack from settling into the sediment which collects in the dipping tank. They also serve as supports for the rack while it is being filled.

Having described my invention and its objects, what I claim as new and wish to protect by Letters Patent is:

1. A dipping rack comprising, a base formed of side members and transverse end members, the ends of said side members bent downward to form legs and angularly upward to form two suspending members, a plurality of spaced bars placed parallel with the side members and supported on the end members, a plurality of spacing members secured transversely on the base to form spaces for supporting individual films, and intermediate rods connecting said bars with the top of said spacing members for preventing such films from contacting with each other when inserted in the spaces.

2. A dipping rack comprising, a base formed of side members and transverse end members, the ends of said side members bent downward to form legs and angularly upward to form two suspending members, a plurality of spaced bars placed parallel with the side members and supported on the end members, a plurality of spacing members secured transversely on the base to form spaces for supporting individual films, intermediate rods connecting said bars with the top of said spacing members for preventing such films from contacting with each other when inserted in the spaces, and a spacing bar inserted between the upper ends of the suspending members to strengthen the rack.

CHARLES BENDER.